United States Patent [19]
Walker

[11] 3,938,976
[45] Feb. 17, 1976

[54] PROCESSES AND APPARATUS FOR FEEDING MATERIAL TO A GLASS MELTING TANK

[75] Inventor: Norman Isaac Webb Walker, Liverpool, England

[73] Assignee: Pilkington Brothers Limited, St. Helens, England

[22] Filed: Dec. 27, 1973

[21] Appl. No.: 429,019

[30] Foreign Application Priority Data
Dec. 28, 1972 United Kingdom............... 59836/72

[52] U.S. Cl. .................. 65/29; 65/161; 65/335; 65/DIG. 13; 214/18.26
[51] Int. Cl.² ........................................... C03B 3/00
[58] Field of Search 65/29, 160, 161, 335, DIG. 13; 214/18.26

[56] References Cited
UNITED STATES PATENTS

| | | | |
|---|---|---|---|
| 1,928,016 | 9/1933 | Halbach et al.................... | 65/160 X |
| 3,725,022 | 4/1973 | Mills................................. | 65/160 X |
| 3,779,731 | 12/1973 | Pollock............................. | 65/161 X |

*Primary Examiner*—Arthur D. Kellogg
*Attorney, Agent, or Firm*—Sughrue, Rothwell, Mion, Zinn & Macpeak

[57] ABSTRACT

Apparatus for feeding material to a glass melting tank comprises a batch material feed system and a cullet feed system. A first control unit controls the rate of the batch feed and a second control unit controls the cullet feed rate. One of the control units receives a signal dependant on the glass level in the tank and thereby controls the rate of one feed system in dependance on the glass level. A ratio control unit is provided to adjust the other control unit so the two feed systems operate at a predetermined ratio of feed rates.

12 Claims, 1 Drawing Figure

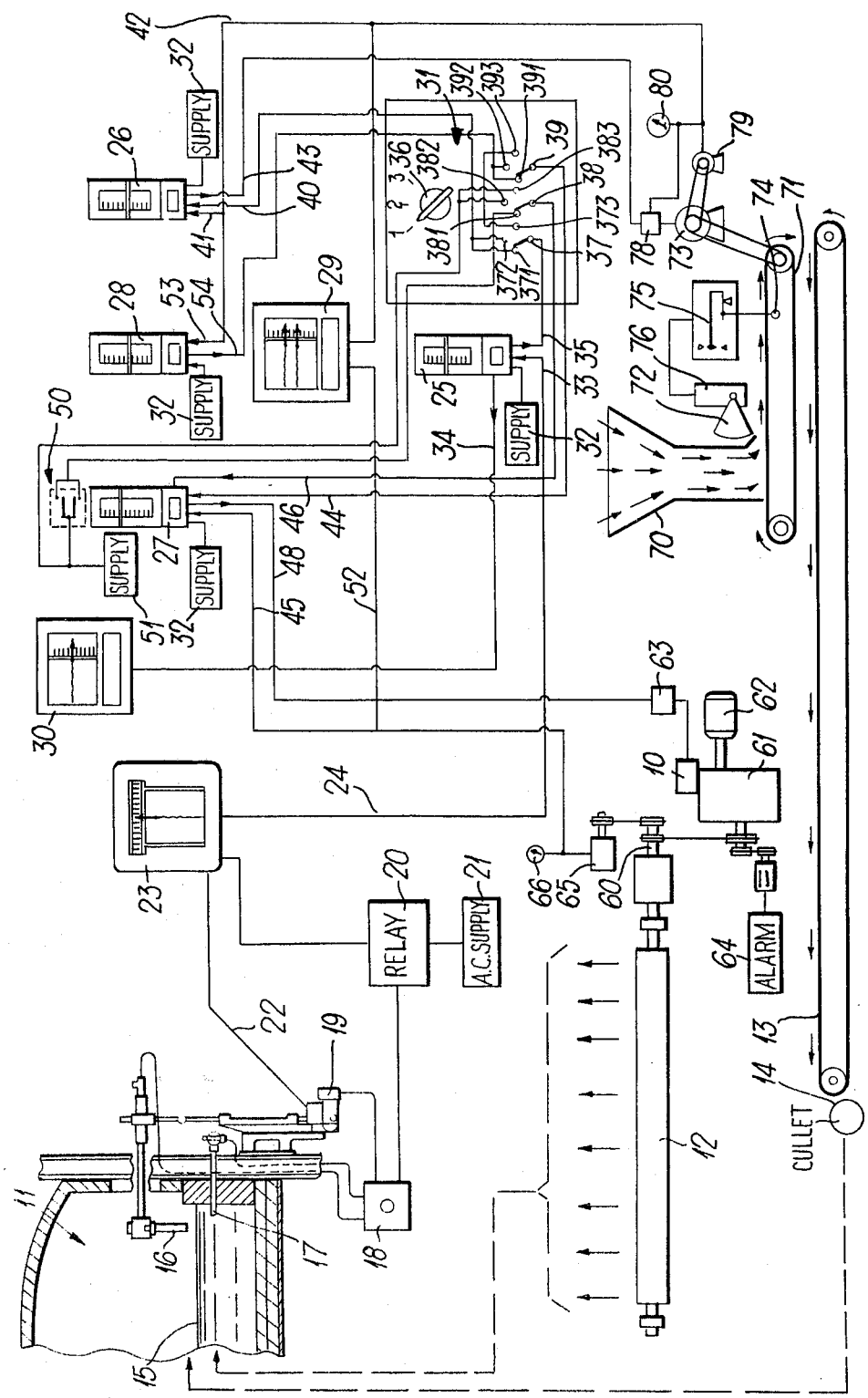

PROCESSES AND APPARATUS FOR FEEDING MATERIAL TO A GLASS MELTING TANK

BACKGROUND OF THE INVENTION

The invention relates to glass manufacturing processes and apparatus and more particularly to processes and apparatus for feeding glass forming material to a glass tank or furnace in which it is required to maintain a controlled level of molten glass.

In a known process for the manufacture of glass, batch material and cullet, which consists of broken or refuse glass, are fed to a glass melting tank from which molten glass is withdrawn as the glass is formed. It is normally required to maintain the molten glass level in the tank at a controlled level and consequently the incoming material must be supplied at a controlled rate. It is known to use a level detector within the tank for sensing the level of molten glass and to use the output of the level detector for automatically controlling the rate of feed of batch material to the tank. The amount of cullet supplementing the batch material is normally controlled manually.

SUMMARY OF THE INVENTION

It is an object of the present invention to enable automatic control of the rate of feed of both batch material and cullet.

The present invention provides apparatus for feeding material to a glass melting tank comprising a first feed system for feeding batch material to the tank at an adjustable rate, a second feed system for feeding cullet to the tank at an adjustable rate, a first control device for controlling the rate of feed of the first system, a second control device for controlling the rate of feed of the second system, one of the control devices being arranged to receive a first control signal dependent on the output of a glass level detector for detecting the level of glass within the tank, and thereby control the feed rate of the associated feed system in dependence on the level detected, and a ratio control unit arranged to receive a signal dependent on the rate of feed of the said associated feed system and provide a second control signal to the other control device such that the first and second control signals correspond to a predetermined ratio of feed rates for the two feed systems.

Preferably each control device includes means for setting a desired feed rate, an input arranged to receive a signal from its associated feed system indicating the actual feed rate of the system, and an output arranged to provide an output signal depending on the difference between the actual and desired feed rates. Preferably the means for setting the desired feed rate in the control devices is responsive to the first and second control signals respectively.

Preferably the apparatus includes a level control device having means for setting a desired level of glass within the tank, an input arranged to receive a signal representing the actual level within the tank and an output arranged to provide said first control signal in dependence on the difference between the desired and actual levels. The invention includes apparatus in which a glass level detecting device is coupled to the level control device and arranged to detect glass level within the tank.

Preferably selector switch means is provided to connect the first control signal to either the first or second control device. Although it is preferable for the output of the level control device to be fed to the second control device controlling the rate of feed of cullet, the provision of such selector switch means enables the outlet of the level control device to control directly the batch feed rate if preferred.

Preferably the first and second control devices include means for manually adjusting the desired feed rate so that each may be manually set when not arranged to receive the output of the level control device. Conveniently the ratio control unit is also manually adjustable to vary the ratio of the second control signal to the input to the ratio control unit.

Preferably the said other control device includes manually operable means for adjusting the desired feed rate, means responsive to the second control signal for automatically adjusting the desired feed rate, and limit switch means responsive to the difference between the actual feed rate and the desired feed rate indicated by the second control signal and arranged to effect automatic adjustment of the desired feed rate if the difference exceeds predetermined limits. The selector switch may be arranged to switch in and out the limit switch means when desired.

Each feed system may include a rotary member coupled to a motor, for controlling the feed rate, and a variable speed control device for each motor arranged to respond to the output of the associated first and second control device.

The invention includes a method of controlling feeding rates of batch material and cullet which are fed by two separate feed systems to a glass melting tank, which method comprises detecting the level of glass within the tank, forming a first control signal representing the difference between the actual level and a desired level, controlling the feed rate of one feed system in dependence on the first control signal, generating a second control signal corresponding to a feed rate for the other feed system which is a desired ratio of the feed rate of the said one system, and supplying said second control signal to a control device for controlling said other feed system.

The control device of said other feed system may be arranged to respond to the second control signal only when the second control signal varies beyond predetermined limits. The said one feed system is conveniently the system feeding cullet.

BRIEF DESCRIPTION OF THE DRAWING

The accompanying drawing shows schematically a control system for controlling feeding rates of batch material and cullet to a glass melting furnace.

DESCRIPTION OF THE PREFERRED EMBODIMENT

This example shows a glass melting tank or furnace 11 used in the manufacture of glass. Batch material which consists of normal known constituents used to form glass is fed to the interior of the tank by a conveyor shown schematically by the roller 12. The batch material is supplemented by cullet which is also fed to the interior of the tank from a conveyor 13. The roller conveyor 12 may be supplied from a hopper so that the batch material lies on the conveyor with uniform thickness. In this way, the rate of feed of batch material is dependent on speed of rotation of the roller 12. The cullet leaving the conveyor 13 may pass through a delivery tube or passage 14 leading from the conveyor 13 to the furnace 11. The glass is maintained in a molten condition in the furnace 11, by heat applied within the furnace, and as glass is withdrawn from the tank, the speed of delivery of batch material and cullet must be controlled so as to maintain the molten glass level within the tank at the desired level shown at 15 in the drawing. The glass level 15 is sensed by a known type of level probe 16. The probe 16 is water cooled and the electrical resistance is sensed between the probe 16 and a return electrode 17 mounted in the side wall of the tank below glass level. Electrical leads from the probe 16 and return electrode 17 pass to a junction box 18 which is also connected to a probe drive unit 19 used to reciprocate the probe in a vertical direction, so that the electrical resistance may be measured when the top of the probe detects the glass surface position. The timing of reciprocation is controlled by a relay unit 20 fed from a power supply 21. An output signal from the glass level detecting probe is fed along line 22 from the drive unit to a chart recorder 23 which gives a visual display of the detected glass level. An output signal is taken on line 24 from the chart recorder 23 and is used to control the feed rates of batch material and cullet.

The feed control system mainly consists of a level control unit 25, a cullet speed control unit 26, a batch material control unit 27, a ratio control unit 28, two chart recorders 29 and 30 and a selector switch 31. Each of the control devices 25, 26, 27 and 28 is connected to a power supply unit 32. The level control unit 25 has an input 33 derived from line 24 indicating the level detected by the probe 16. The unit 25 provides two outputs, one along line 34 to the chart recorder 30, thereby giving a visual indication of the actual level of glass in the tank, and a second output on line 35 representing the difference between the actual glass level and the desired level set at the control unit 25. The control unit 25 is a conventional deviation indicating control station having a window with a horizontal set point band covering a vertically arranged tape scale. A manually adjustable thumb wheel is provided which adjusts the position of the scale relative to the horizontal set point band. In this way, the thumb wheel may be adjusted to indicate any particular desired value, called a set point, representing in this case the glass level within the tank. The control unit 25 also includes a pointer indicating the value of level given by the input 33 and when the glass level measured by the probe is equal to the desired value, the pointer will be positioned behind the horizontal set point band on the control unit. The output on line 35 indicates the difference between the desired and actual levels of glass within the tank and is fed to the selector switch 31 which may be adjusted to one of three positions depending on which mode of operation is required. The switch 31, which is under the control of a manually adjustable knob 36, has three input switch members 37, 38 and 39. Each of these inputs may be connected to one of three alternative associated outputs depending on the setting of the switch 31. These alternative outputs have been marked 371, 372, 373 and 381, 382, 383 and 391, 392 and 393.

The cullet control unit 26 and batch control unit 27 are generally similar and both comprise conventional deviation indicating control stations. They are generally similar to the level control unit 25 already described in having a horizontal set point band behind which a tape scale may be adjusted to indicate a desired set point. The set point may be adjusted manually by a thumb wheel or automatically by a set point input signal. The cullet control unit 26 has a set point input 40 taken from the selector switch 31 which automatically adjusts the set point (or desired cullet feed rate). A second input 41 is derived from line 42 connected to the cullet feeding system and indicates the actual cullet feed rate. The line 42 is also connected to the chart recorder 29 which has one pen indicating the actual cullet feed rate. The cullet control unit 26 has an output 43 connected back to the cullet feed system, to be described below, for controlling the cullet feed rate. The batch control unit 27 similarly has a set point input 44 taken from the selector switch 31, for automatically adjusting the set point (that is desired batch feed rate) of the batch control unit 27. A second input 45 is taken from the batch feeding system, to be described below, and indicates the actual batch feed rate. A third input on line 46 is taken from the selector switch 31 and controls whether the batch control unit 27 operates on a manually set point or the automatically adjusted set point. The presence of an automatic operation signal is required on the input 46 before the batch control unit 27 adjusts the set point automatically. The control unit 27 provides an output on line 48 representing the desired batch feed rate and this signal 48 is fed to the batch feeding device to be described below. The batch control unit 27 also includes a high and low limit switch device 50 coupled to a power supply 51. The terminals 382 and 383 of the selector switch 31 are connected directly to the power supply 51 whereas the terminal 381 is connected to the power supply 51 via the limit switch 50 so that connection is made to terminal 381 only if the input signal on line 44 differs from the actual batch feed rate indicated by the signal on line 45 by more than the limits set by the switch 50. The actual batch feed rate signal on line 45 is also connected by line 52 to the chart recorder 29 which has a pen indicating the actual batch feed rate.

The ratio control unit 28 is a standard ratio/bias station which, similar to the control units 25, 26 and 27, has a horizontal set point band overlying a vertically adjustable tape scale. The position of the tape scale may be adjusted by a manual thumb wheel so as to indicate the desired ratio between the input and output signals of the unit 28. In this particular example, the ratio control unit 28 has an input signal 53 taken from the line 42 so that the input 53 represents the actual cullet feed rate. The output signal 54, which is the predetermined ratio of the input 53, is fed back to terminals 391 and 392 of the selector switch.

The batch feed roller 12 is connected to a shaft 60 which in turn is driven through a variable speed gear box 61 by an electric motor 62. The variable speed gear box 61 is provided with a gear ratio changing motor 10 controlled by a thyristor unit 63 which receives the output signal 48 from the batch control unit 27. In this way the signal on line 48 adjusts the gear box 61 and varies the speed of rotation of the roller 12. The output of the gear box 61 is also connected to an alarm unit 64 so that an alarm may be provided if the speed varies beyond acceptable limits. The shaft 60 is also connected to a speed transmitter unit 65 provided with a visual indicator 66. The output of the unit 65 is fed along line 45 to the batch control unit 27 so as to provide an indication of the actual batch feed rate.

In the case of the cullet feeding system, cullet is fed from a hopper 70 onto a constant weight feeder conveyor 71. The conveyor 71, which is a closed loop conveyor, is driven at an adjustable speed by a variable speed motor 73. The belt of the conveyor 71 passes over a weighing roller 74 arranged to operate a limit switch system 75 depending on the weight detected by the roller 74. The switch system 75 controls power supply to a motor 76 which in turn controls an adjustable gate 72 controlling the rate of flow of cullet from the hopper 70 onto the conveyor 71. In this way, the weighing roller 74 ensures a constant weight of cullet per unit length of conveyor 71. The rate of cullet feed is therefore controlled by the speed of drive of the motor 73. The cullet falls from the conveyor 71 onto the feeding conveyor 13 leading towards the furnace 11. The motor 73 is controlled by a thyristor unit 78 which in turn receives the output signal 43 from the cullet control unit 26. In this way, the output signal 43 controls the speed of drive of the motor 73. The motor 73 is also connected to a speed transmitting unit 79 provided with a visual speed indicator 80. An output from the speed transmitter 79 is fed along line 42 to both the cullet control unit 26 and ratio control unit 28, thereby indicating the measured speed of cullet feed.

The operation of the above described apparatus is as follows. The level control unit 25 is manually adjusted so as to preset the desired level of glass within the tank 11. The selector switch 31 is ajusted by the knob 36 to the desired mode of operation. In mode 1, terminal 37 is connected to 371, terminal 38 is connected to 381, and terminal 39 is connected to 391. In this way, the level control signal on line 35 is fed to vary the set point input 40 of the cullet control unit 26. This signal alters the desired cullet feed rate and the output signal 43 fed back to the motor 73 adjusts the speed of cullet feed so that the cullet feed rate is automatically adjusted with variations in the glass level measured by the probe 16. At the same time, the actual cullet feed rate is fed to input 53 of the ratio control unit 28 which has been manually preset to a desired ratio of cullet to batch feed rates. The output 54 from the ratio control unit 28 is fed back through terminals 391 and 39 of the selector switch to vary the set point input 44 of the batch control unit 27. However, the automatic control input 46 of the batch control unit 27 is connected via terminals 38 and 381 through the high/low limit switch 50 to the power supply 51. Consequently, the set point of the batch control unit 27 will not be automatically adjusted in dependence on the signal on line 44 unless this deviates beyond the higher or lower limits from the actual batch feed rate indicated on input 45. If however the high or low limits should be exceeded, an input is provided on line 46 which automatically adjusts the set point of control unit 27. If the adjustments in feed rates bring the actual and desired batch feed rates back within the high/low limits the automatic control input 46 will be de-energised and the set point in the control unit will then remain set at the last value to which it was driven under automatic control. This condition will continue until either the set point is adjusted manually or the high/low limits are again exceeded. The output on line 48 is fed to the thyristor control unit 63 which in turn controls the speed of rotation of the roller 12.

In mode 2 of operation, terminal 37 is connected to 372, 38 is connected to 382 and 39 is connected to 392. In this case, the level control signal on line 35 is still fed to the set point input 40 of the cullet control unit 26 and the cullet feed rate is automatically adjusted with changes in glass level as previously described with reference to mode 1. Furthermore, the output 54 from the ratio control unit 28 is fed via connections 392 and 39 to the set point input 44 of the batch control unit 27 as previously described. However, in this case the automatic operation of the batch control unit 27 is ensured as the input 46 is connected via connections 38, 382 directly to the power supply 51 without passing through the high/low limit switch 50. Consequently, the output 48 from the batch control unit 27 is automatically adjusted with changes in glass level so that the batch feed rate is maintained at a set ratio of the cullet feed rate.

In mode 3 of operation, the terminal 37 is connected to 373, 38 is connected to 383 and 39 is connected to 393. In this case the level control signal 35 is fed via connections 37, 371 393 and 39 to the set point input 44 of the batch control unit 27. An automatic operation signal is provided on line 46 via connections 38 and 383. Consequently, the output on line 48 from the batch control unit 27 automatically adjusts the batch feed rate with changes in glass level. In this case however no input signal is supplied on the set point input 40 to the cullet control unit 26 as the terminals 371 and 372 remain disconnected. Consequently, the output on line 43 from the cullet control unit 26 is regulated by the manual setting of the cullet control unit 26. Hence in mode 3 of operation, the batch feed rate is automatically adjusted with changes in glass level but the cullet feed rate must be manually controlled.

It will be seen from the above that mode 2 is the only mode in which the cullet and batch feed rates are automatically adjusted with changes in glass level so as to maintain a desired ratio of batch to cullet at all times. In mode 1, the cullet feed always responds to changes in glass level but as long as the change on the cullet feed is within certain limits, the batch feed rate remains constant depending on the manual setting. In this case the cullet is used to trim the level of glass as it is the faster melting component being fed to the tank. It is only when certain prefixed limits are exceeded that an adjustment is made to the new batch feed.

The invention is not restricted to the details of the foregoing example. It may be arranged in mode 2 that the level control signal 35 is fed to the batch control unit 27 and the output of the ratio control unit 28 is fed to the cullet control unit 26.

I claim:

1. Apparatus for feeding material to a glass melting tank comprising, a first feed means for feeding solid batch material to the tank at an adjustable and controlled rate, a second feed means for feeding cullet to the tank at an adjustable and controlled rate, a first control means for controlling the rate of feed of the solid batch material in said first feed means, a second control means for controlling the rate of feed of cullet in said second feed means, a glass level detector for detecting the level of glass within the tank and generating a first control signal indicative of said level, one of said control means being arranged to receive said first control signal and thereby control the feed rate of the associated feed means in dependence on the level detected, and an adjustable ratio control unit arranged to receive a signal dependent on the rate of feed of said associated feed means and provide a second control signal to the other of said control means such that the first and second control signals correspond and maintain a predetermined ratio of feed rates for the two feed systems.

2. Apparatus according to claim 1, in which each control means includes means for setting a desired feed rate, an input arranged to receive a signal from its associated feed means indicating the actual feed rate of the system, and an output arranged to provide an output signal depending on the difference between the actual and desired feed rates.

3. Apparatus according to claim 2, in which the means for setting the desired feed rate in the control devices is responsive to the first and second control signals respectively.

4. Apparatus according to claim 1, including a level control device having means for setting a desired level of glass within the tank, an input arranged to receive a signal representing the actual level within the tank and an output arranged to provide said first control signal in dependence on the difference between the desired and actual levels.

5. Apparatus according to claim 1, including selector switch means provided to connect the first control signal to either the first or second control device.

6. Apparatus according to claim 1, in which the ratio control unit is manually adjustable to vary the ratio of the second control signal to the input to the ratio control unit.

7. Apparatus according to claim 3, in which the said other control means includes manually operable means for adjusting the desired feed rate, means responsive to the second control signal for automatically adjusting the desired feed rate, and limit switch means responsive to the difference between the actual feed rate and the desired feed rate indicated by the second control signal, and arranged to effect automatic adjustment of the desired feed rate if the difference exceeds predetermined limits.

8. Apparatus according to claim 1, in which each feed means includes a rotary member coupled to a motor, for controlling the feed rate, a variable speed control device being provided for each motor and arranged to respond to the output of the associated first or second control means.

9. Apparatus according to claim 1, in which said other control means is the control means controlling the feed rate of batch material.

10. A method of controlling feeding rates of batch material and cullet which are fed by two separate feed systems to a glass melting tank, comprising the steps of establishing a fixed reference level of glass within the tank, detecting the level of glass within the tank, generating a first control signal representing the difference between the actual level of glass within the tank and the fixed level, controlling the feed rate in an adjustable manner of one feed system in dependence on the first control signal, establishing a ratio of feeds between the two separate feed systems, generating a second control signal corresponding to a feed rate for the other feed system which is a function of the established ratio of the feed rate of the said one system, and supplying said second control signal to a control device for controlling the rate of feed in an adjustable manner said other feed system.

11. A method according to claim 10, in which the control device of said other feed system is arranged to respond to the second control signal only when the second control signal varies beyond predetermined limits.

12. A method according to claim 10, in which said one feed system is the system feeding cullet.

* * * * *